(12) United States Patent
Ou et al.

(10) Patent No.: US 11,073,484 B2
(45) Date of Patent: Jul. 27, 2021

(54) IMAGE ACCELERATION PROCESSING DEVICE FOR AUTOMATIC OPTICAL INSPECTION OF LCD MODULE

(71) Applicant: Wuhan Jingce Electronic Group Co., Ltd., Wuhan (CN)

(72) Inventors: Changdong Ou, Wuhan (CN); Zhou Wang, Wuhan (CN); Biaohua Deng, Wuhan (CN); Wentian Tang, Wuhan (CN); Linhai Mei, Wuhan (CN); Wenzhong Dong, Wuhan (CN); Bo Li, Wuhan (CN); Moxiao Xu, Wuhan (CN)

(73) Assignee: WUHAN JINGCE ELECTRONIC GROUP CO., LTD., Wuhan (CN)

( * ) Notice: Subject to any disclaimer, the term of this patent is extended or adjusted under 35 U.S.C. 154(b) by 0 days.

(21) Appl. No.: 16/861,263

(22) Filed: Apr. 29, 2020

(65) Prior Publication Data

US 2020/0300780 A1 Sep. 24, 2020

Related U.S. Application Data

(63) Continuation-in-part of application No. PCT/CN2018/102155, filed on Aug. 24, 2018.

(30) Foreign Application Priority Data

Oct. 31, 2017 (CN) .......................... 201711049464.1

(51) Int. Cl.
*G01N 21/956* (2006.01)
*G06T 7/00* (2017.01)
*G01N 21/95* (2006.01)

(52) U.S. Cl.
CPC ......... *G01N 21/956* (2013.01); *G06T 7/0004* (2013.01); *G01N 2021/9513* (2013.01); *G06T 2207/30121* (2013.01)

(58) Field of Classification Search
CPC ........ G05B 19/0428; G05B 2219/2656; G05B 19/042; G01N 2021/8887;
(Continued)

(56) References Cited

U.S. PATENT DOCUMENTS 7,342,838 B1 * 3/2008 Sharpe-Geisler .......................... G06F 13/4243
326/39
9,608,758 B1 3/2017 Zhao et al.
(Continued)

FOREIGN PATENT DOCUMENTS

CN 101441334 A 5/2009
CN 104239271 A 12/2014
(Continued)

OTHER PUBLICATIONS

Zhenhai Chai, Image Parallel Processing, Infrared (Monthly), Mar. 31, 2005, pp. 27-33, vol. 3, China Academic Journal Electronic Publishing House, China.

*Primary Examiner* — Michael J Vanchy, Jr.
(74) *Attorney, Agent, or Firm* — Matthias Scholl P.C.; Matthias Scholl

(57) ABSTRACT

An image acceleration processing device including a field programmable gate array (FPGA) processing platform; and a personal computer (PC). The FPGA processing platform includes: a first fiber interface configured to receive configuration parameters and test commands, and to output test results; a second fiber interface configured to exchange data with the PC; a third fiber interface configured to receive image data and output the configuration parameters and the test commands; a fourth fiber interface configured to control the generation of a screen lighting signal; and a fifth fiber interface configured to control an input/output (IO) light source.

8 Claims, 8 Drawing Sheets

(58) Field of Classification Search
CPC ... G01N 2021/8896; G01N 2021/9513; G01N 21/01; G01N 21/95; G01N 21/956; G06T 1/0014; G06T 2207/30121; G06T 2207/30168; G06T 7/00; G06T 7/0002; G06T 7/0004; G06T 1/20
See application file for complete search history.

(56) References Cited

U.S. PATENT DOCUMENTS

| | | | | |
|---|---|---|---|---|
| 2005/0198373 A1* | 9/2005 | Saunderson | .......... | H04L 12/423 709/238 |
| 2013/0328948 A1* | 12/2013 | Kunkel | .................... | G09G 3/20 345/690 |
| 2015/0057961 A1* | 2/2015 | Montoya | ............. | G06F 11/2294 702/121 |
| 2015/0234006 A1* | 8/2015 | Richards | .............. | G01R 31/308 324/756.02 |
| 2017/0175711 A1 | 6/2017 | Burkle | | |

FOREIGN PATENT DOCUMENTS

| | | | |
|---|---|---|---|
| CN | 104393922 A | | 3/2015 |
| CN | 104698612 A | | 6/2015 |
| CN | 105607312 A | * | 5/2016 |
| CN | 105607312 A | | 5/2016 |
| CN | 106412474 A | | 2/2017 |
| CN | 107817217 A | | 3/2018 |

* cited by examiner

IMAGE ACCELERATION PROCESSING DEVICE FOR AUTOMATIC OPTICAL INSPECTION OF LCD MODULE

CROSS-REFERENCE TO RELATED APPLICATIONS

This application is a continuation-in-part of International Patent Application No. PCT/CN2018/102155 with an international filing date of Aug. 24, 2018, designating the United States, and further claims foreign priority benefits to Chinese Patent Application No. 201711049464.1 filed Oct. 31, 2017. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure belongs to the technical field of automatic optical inspection, and more particularly to an image acceleration processing device suitable for LCM (LCD module) automatic optical inspection.

At present, TFT-LCD production inspection is mainly manual. With the improvement of the resolution and size of LCD panels, it is difficult for naked eyes to identify tiny defects. Under the demand of mass production, the workers on the production line need to detect the appearance of many pictures or modules quickly and repeatedly, which is easy to cause missed inspection or over inspection and visual fatigue.

To save labor cost, panel manufacturers began to adopt automated optical inspection (AOI) equipment instead of manual labor for intelligent manufacturing. Conventional automated optical inspection requires a plurality of industrial cameras and charge-coupled devices (CCDs), and the amount of image calculation data increases dramatically. The image data needs to be processed in real time, and the processing time determines the capacity of the production line. Traditional PC or PCs cannot deal with such a large amount of data.

SUMMARY

The disclosure provides an image acceleration processing device suitable for LCM automatic optical inspection, which can comprehensively control the generation of the screen lighting signal, the light source, and calculation processing.

The disclosure provides an image acceleration processing device comprising a field programmable gate array (FPGA) processing platform; and a personal computer (PC). The FPGA processing platform comprises: a first fiber interface configured to receive configuration parameters and test commands, and to output test results; a second fiber interface configured to exchange data with the PC; a third fiber interface configured to receive image data and output the configuration parameters and the test commands; a fourth fiber interface configured to control the generation of a screen lighting signal; and a fifth fiber interface configured to control an input/output (IO) light source.

The FPGA processing platform further comprises a control unit and a double data rate (DDR) memory; the PC comprises CPU and GPU, and is configured to calculate and process the image data received and transmit a data processing result to the control unit; the control unit is configured to receive the configuration parameters and test commands, control the generation of the screen lighting signal and control the IO light source according the configuration parameters and test commands received, receive image data of an acquisition unit, preprocess and transmit the image data received to the PC, receive and gather the data processing result of the PC, and transmit a final test result to the control unit; and the DDR memory is configured to store the image data and the final test result.

The control unit comprises:

an image data receiving module, configured to receive and transmit the image data of the acquisition unit to a DDR data format conversion-and-writing module;

the DDR data format conversion-and-writing module, configured to format the image data received and store the image data formatted in the DDR memory;

a flow control module, configured to transmit control commands to an image processing accelerator and the PC according to set instructions;

the image processing accelerator, configured to preprocess the image data and store the image data processed in the DDR memory according to the control commands of the flow control module;

a data distribution control module, configured to distribute the image data to a data distribution and transmission module according to the control commands of the flow control module;

the data distribution and transmission module, configured to receive and transmit the image data to the PC, and receive and transmit the data processing result of the PC to an analysis and processing module; and the analysis and processing module, configured to analyze the data processing result to generate the final test result.

The control unit further comprises: an interactive control module, an IO control module, and a screen lighting signal generation module;

the interactive control module is configured to receive the test commands and report test results;

the flow control module is further configured to assign the test commands received to the IO control module and a signal spreading module;

the IO control module is configured to control the IO light source according to the test commands; and the screen lighting signal generation module is configured to control the generation of the screen lighting signal according to the test commands.

The image data receiving module comprises:

a first link state reporting module, configured to regularly transmit a physical link state of the image data receiving module to a first data packet;

a first data packet, configured to packet and transmit the physical link state of the image data receiving module, the configuration parameters and the test commands to a first high-speed controller IP;

the first high-speed controller IP, configured to receive the image data of the acquisition unit and transmit the configuration parameters and test commands to the acquisition unit;

a first link state examination module, configured to regularly receive the physical link state from a first data unpacket; and the first data unpacket, configured to analyze and output the image data transmitted by the first high-speed controller IP to the DDR data format conversion-and-writing module.

The DDR data format conversion-and-writing module comprises:

an image data receiving module, configured to receive and transmit the image data to a local FIFO;

the local FIFO, configured to store the image data;

a read FIFO data interface conversion module, configured to read and format the image data in the local FIFO according to a control logic, and transmit the image data formatted to the DDR memory; and a write DDR address control logic module, configured to output the control logic.

The image processing accelerator comprises:

an image block processing module, configured to divide an image into blocks according to the control commands;

a read DDR control module, configured to read and transmit the image data stored in the DDR memory to an image processing module;

the image processing module, configured to preprocess the image data received;

and a write DDR control module, configured to store the image data preprocessed in the DDR memory.

The data distribution control module comprises:

a second link state reporting module, configured to regularly transmit a physical link state of the data distribution and transmission module to a second data packet;

a second data packet, configured to packet and transmit the image data received to a second high-speed controller IP;

the second high-speed controller IP, configured transmit the image data received to the PC, and receive the data processing result from the PC;

a second link state examination module, configured to regularly receive the physical link state from a second data unpacket; and the second data unpacket, configured to analyze the data processing result from the PC and the physical link state of the data distribution and transmission module.

The interactive control module comprises:

a third link state reporting module, configured to regularly transmit a physical link state of the interactive control module to a third data packet;

the third data packet, configured to packet and transmit the test results received to a third high-speed controller IP;

the third high-speed controller IP, configured to receive and report the test results, and receive the configuration parameters;

a third link state examination module, configured to regularly receive the physical link state reported by a third data unpacket; and the third data unpacket, configured to analyze the configuration parameters transmitted by the third high-speed controller IP and the physical link state of the interactive control module.

The control unit further comprises a cascade control module configured to realize the cascade expansion of the FPGA processing platform under the control of the flow control module.

Advantages of the image acceleration processing device according to embodiments of the disclosure are summarized as follows.

The FPGA processing platform comprises a plurality of optical fiber interfaces adapted for data communication and interaction with various devices through optical fibers, with fast data transmission speed, thereby achieving the integrated control of the generation of the screen lighting signal, signal expansion, light source and data processing, with short tact time. The FPGA processing platform supports cascade control, and can support more PCs after cascade; the PC adopts CPU+GPU, together with FPGA, forms CPU+ GPU+FPGA architecture, fully expands CPU+GPU unit and enhances GPU's processing ability. The FPGA operates as the central controller, the data to be processed is assigned to different GPU processing units, forming a distributed processing architecture. Meanwhile, FPGA itself operates as an image acceleration processor, coordinates the image block processing and the operations of FPGA and GPUs, thus fulfilling the parallel processing ability of FPGA, effectively improving the image processing and computing capacity. The entire system has the advantages of simple structure, low cost, good stability, good coordination ability and strong computing and processing capacity.

Figure 1:
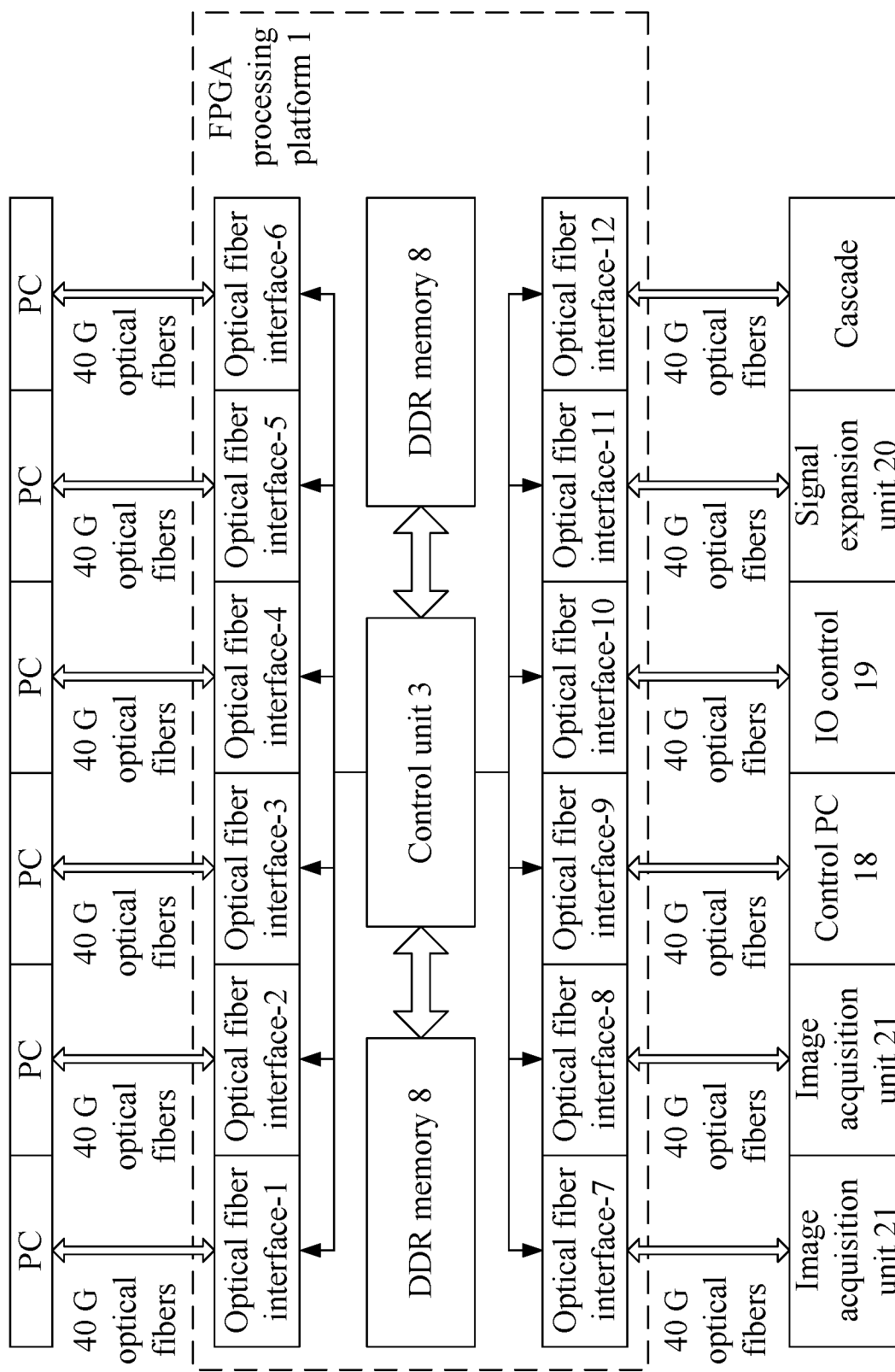
FIG. 1 is a schematic diagram of an image acceleration processing device according to one embodiment of the disclosure.

In the drawings, the following reference numbers are used: 1. FPGA processing platform; 2. PCs; 3. Control unit; 4. Image data receiving module; 4.1 First link state reporting module; 4.2 First data packet; 4.3 First high-speed controller IP; 4.4 First link state examination module; 4.5 First data unpacket; 5. DDR data format conversion-and-writing module; 5.1 Image data receiving module; 5.2 Local FIFO; 5.3 Read FIFO data interface conversion module; 5.4 Write DDR address control logic module; 6. AXI bus; 7. DDR controller; 8. DDR memory; 9. Flow control module; 10. Image processing accelerator; 10.1 Image block processing module; 10.2 Read DDR control module; 10.3 Image processing module; 10.4 Write DDR control module; 11. Data distribution control module; 12. Data distribution and transmission module; 12.1 Second link state reporting module; 12.2 Second data packet; 12.3 Second high-speed controller IP; 12.4 Second link state examination module; 12.5 Second data unpacket; 13. Analysis and processing module; 14. Interactive control module; 14.1 Third link state reporting module; 14.2 Third data packet; 14.3 Third high-speed controller IP; 14.4 Third link state examination module; 14.5 Third data unpacket; 15. IO control module; 16. Screen lighting signal generation module; 17. Cascade control module; 18. Control PC; 19. IO control; 20. Signal expansion unit.

DETAILED DESCRIPTION OF THE EMBODIMENTS

To further illustrate, embodiments detailing an image acceleration processing device are described below. It should be noted that the following embodiments are intended to describe and not to limit the disclosure.

As shown in FIG. 1, an image acceleration processing device of the disclosure comprises a field programmable gate array (FPGA) processing platform 1 and a plurality of PCs 2. The FPGA processing platform 1 comprises: a first fiber interface configured to receive configuration parameters and test commands, and to output test results; a second fiber interface configured to exchange data with the PC 2; a third fiber interface configured to receive image data and output the configuration parameters and the test commands; a fourth fiber interface configured to control the generation of a screen lighting signal; and a fifth fiber interface configured to control an input/output (IO) light source.

The FPGA processing platform 1 further comprises a control unit 3 and a DDR memory 8.

The plurality of PCs 2 comprises CPU and GPU, and is configured to calculate and process the image data received and transmit a data processing result to the control unit.

The control unit 3 is configured to receive the configuration parameters and test commands, control the generation of the screen lighting signal and control the IO light source according the configuration parameters and test commands received, receive image data of an acquisition unit, preprocess and transmit the image data received to the PC, receive and gather the data processing result of the PC, and transmit a final test result to the control unit.

The DDR memory 8 is configured to store the image data and the final test result.

Specifically, in one embodiment, the FPGA processing platform comprises 12 quad small form-factor pluggable (QSFP) plus expansion interfaces. One FPGA processing platform is connected to 6 PCs. The FPGA processing platform communicates and interact with the PCs through 40 G optical fibers. The FPGA processing platform is connected to two or more image acquisition units. Each image acquisition unit can support eight cameralink cameras and eight GigE interface cameras. The FPGA processing platform communicates and interact with the image acquisition unit 21 through 40 G optical fibers. The FPGA processing platform communicates and interact with a control PC 18 through 40 G optical fibers. One IO control 19 is connected to the FPGA processing platform, and the IO control is used for light source control. The FPGA processing platform is connected to a signal expansion unit 20, which can control the generation of screen lighting signal. The FPGA processing platform supports cascade control, which can support the connection of a plurality of PCs after the cascade. The control unit adopts Xilinx SOC FPGA as a main control unit, thus achieving the data interaction control, image acceleration processing and control, cascade process control, data interaction control of the image acquisition unit, and interaction control of the IO light source. The FPGA processing platform supports 256 bit×1600 DDR memory for data storage, thus increasing data processing bandwidth.

In one embodiment, CPU+GPU+FPGA architecture is employed, thereby fully expanding the CPU+GPU unit and enhancing GPU processing capacity. With FPGA as the central controller, the data to be processed is distributed to different GPU processing units, achieving a distributed processing architecture. Meanwhile, FPGA itself operates as an image acceleration processor, coordinates the image block processing and the operations of FPGA and GPUs, thus fulfilling the parallel processing of FPGA. Employing the FPGA as the switching center can solve the bottleneck of data exchange. The FPGA processing platform supports 12 QSFP plus fiber interfaces, and each channel supports 40 Gbps bandwidth transmission. Because FPGA has the capability of parallel distribution, the delay between paths, when the data is distributed, can be ignored. This solves the bandwidth between data exchanges.

Figure 2:
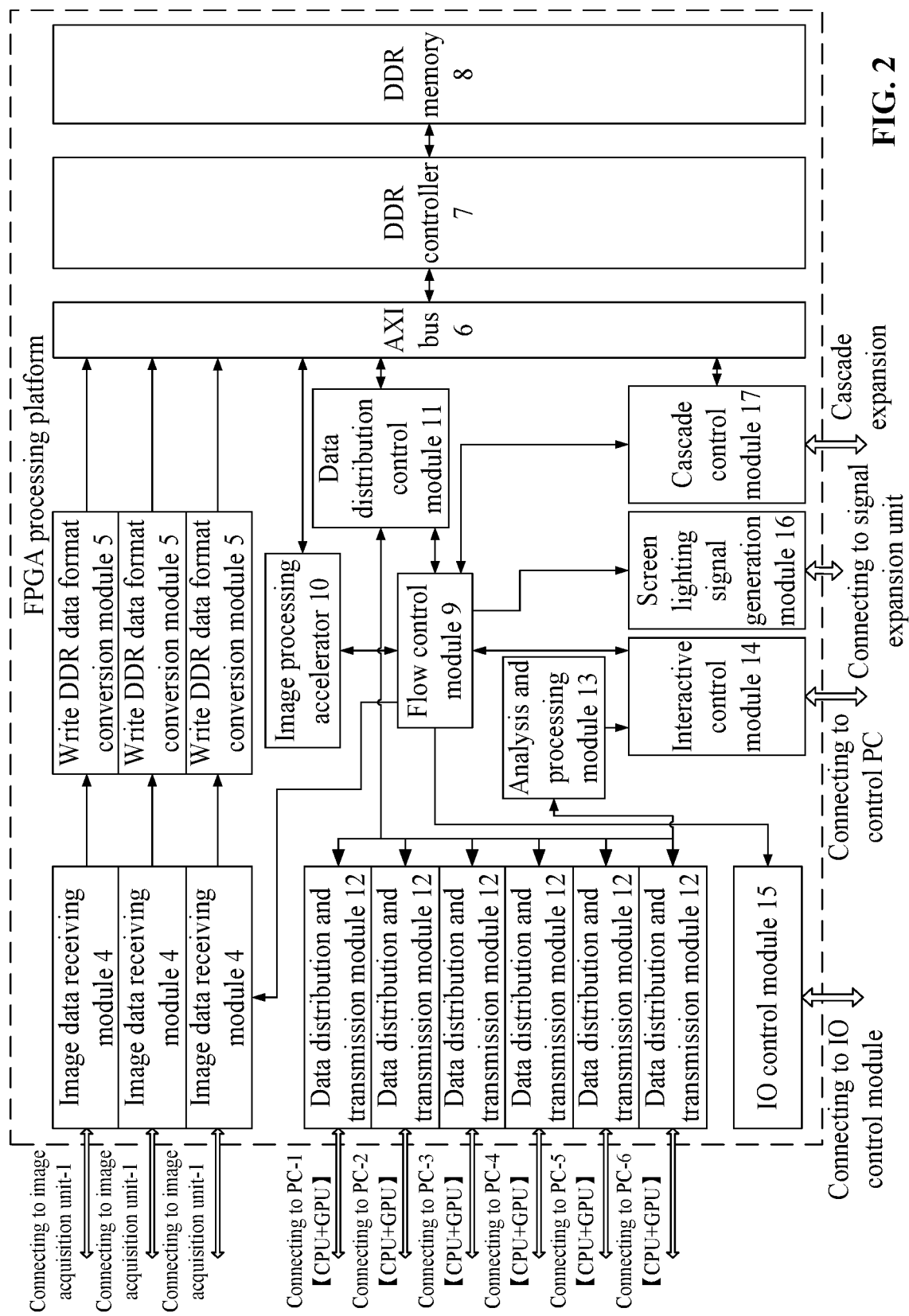
FIG. 2 is a schematic diagram of an FPGA processing platform according to one embodiment of the disclosure.

As shown in FIG. 2, the control unit 3 further comprises:
an image data receiving module 4, configured to receive and transmit the image data of the acquisition unit to a DDR data format conversion-and-writing module;

the DDR data format conversion-and-writing module 5, configured to format the image data received and store the image data formatted in the DDR memory;

an AXI bus 6, configured to read and write the image data to the DDR memory;

a DDR controller 7, configured to control the read and write of the image data;

a flow control module 9, configured to transmit control commands to an image processing accelerator and the PC according to set instructions;

the image processing accelerator 10, configured to preprocess the image data and store the image data processed in the DDR memory according to the control commands of the flow control module;

a data distribution control module 11, configured to distribute the image data to a data distribution and transmission module according to the control commands of the flow control module;

the data distribution and transmission module 12, configured to receive and transmit the image data to the PC, and receive and transmit the data processing result of the PC to an analysis and processing module;

the analysis and processing module 13, configured to analyze the data processing result to generate the final test result;

an interactive control module 14, configured to receive the test commands and report test results;

an IO control module 15, configured to control the IO light source according to the test commands; and a screen lighting signal generation module 16, configured to control the generation of the screen lighting signal according to the test commands.

Figure 3:
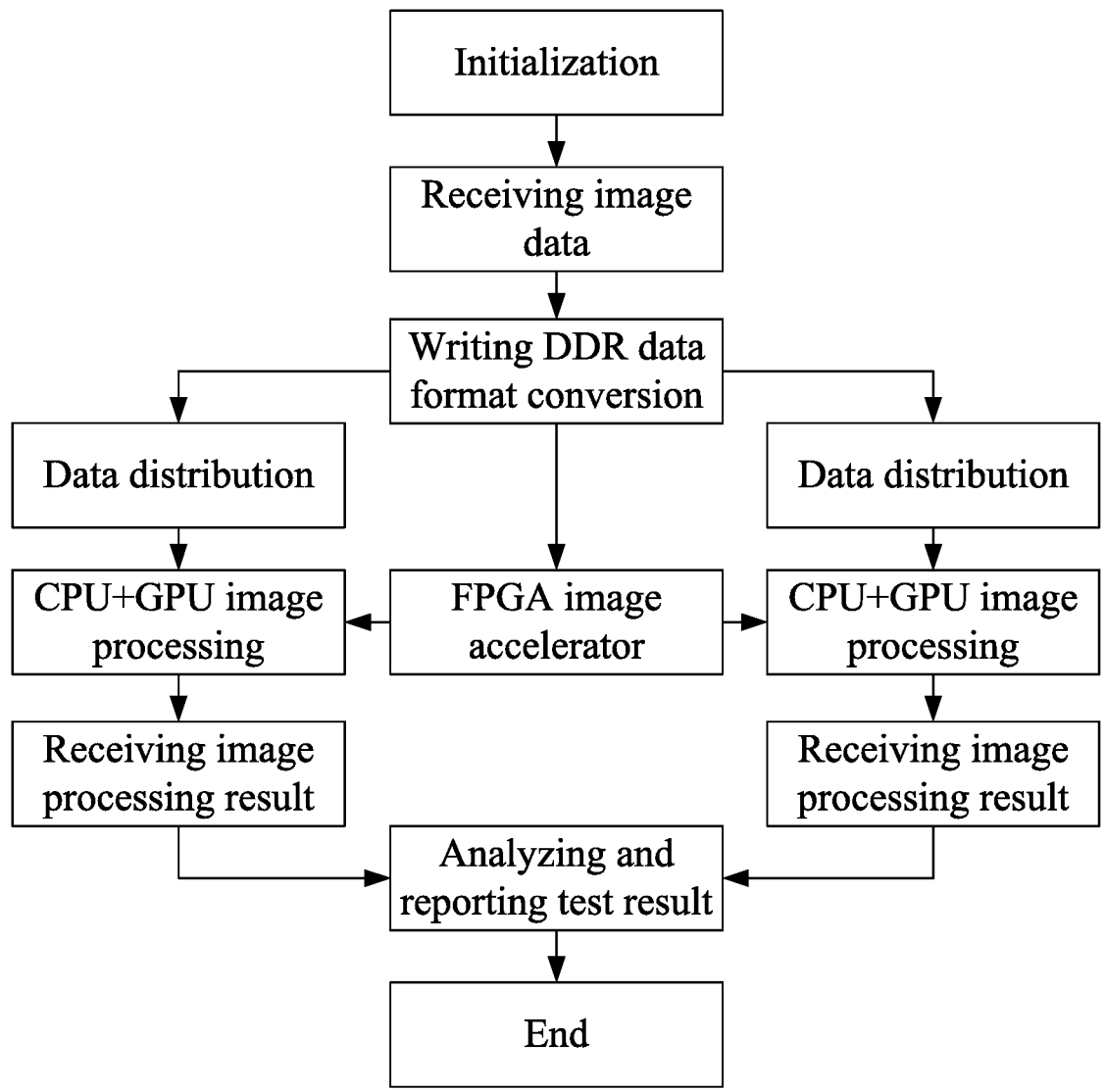
FIG. 3 is a flow chart of data processing according to one embodiment of the disclosure.

As shown in FIG. 3, the flow chart of data processing comprises:
1) initialization;
2) ready to receive the image data;
3) storing the received image data in the local DDR;
4) ready for image processing; according to the configuration parameters, the image is distributed to the plurality of PCs and FPGA image accelerator for image processing;
5) ready to receive the processing results of the PCs;
6) gathering the processing results of the PCs, analyzing and reporting a final test result; and
7) end.

The final rest result is transmitted to the control PC via an optical fiber, and the control PC transmits the result to the MCMQ system of users via ethernet network.

Figure 4:
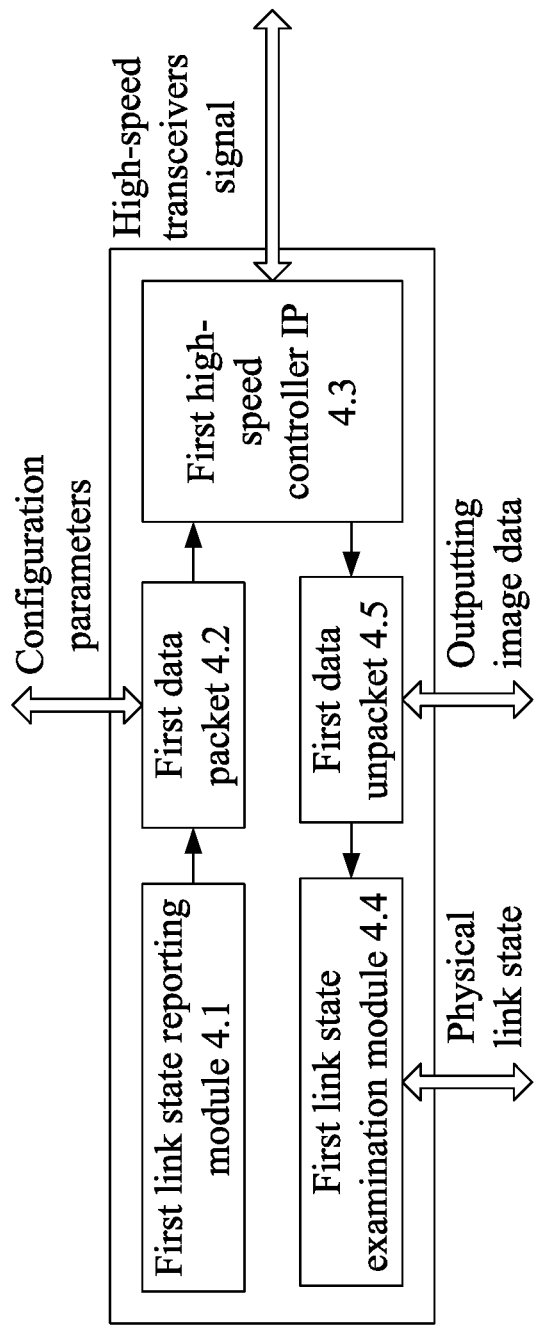
FIG. 4 is a schematic diagram of an image data receiving module according to one embodiment of the disclosure.

As shown in FIG. 4, the image data receiving module 4 comprises:
a first link state reporting module 4.1, configured to regularly transmit a physical link state of the image data receiving module to a first data packet; in one embodiment, the regular time is 65.536 μs;

a first data packet 4.2, configured to packet and transmit the physical link state of the image data receiving module, the configuration parameters and the test commands to a first high-speed controller IP;

the first high-speed controller IP 4.3, configured to receive the image data of the acquisition unit and transmit the configuration parameters and test commands to the acquisition unit; in one embodiment, the data communication between GTH transceiver IP of xilinx and high-speed transceivers adopts Aurora 64b/66b protocol;

a first link state examination module 4.4, configured to regularly receive the physical link state from a first data unpacket; in one embodiment, the regular time is 65.536 µs; when the end-to-end reporting is not detected for three consecutive times, the link is considered to be lost; and the first data unpacket 4.5, configured to analyze and output the image data transmitted by the first high-speed controller IP to the DDR data format conversion-and-writing module.

Figure 5:
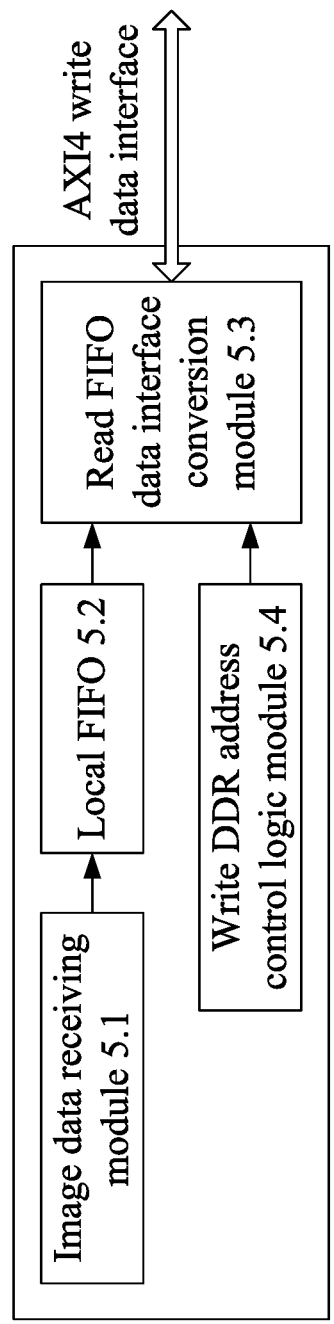
FIG. 5 is a schematic diagram of a DDR data format conversion-and-writing module according to one embodiment of the disclosure.

As shown in FIG. 5, the DDR data format conversion-and-writing module 5 comprises:

an image data receiving module 5.1, configured to receive and transmit the image data to a local FIFO;

the local FIFO 5.2, configured to store the image data;

a read FIFO data interface conversion module 5.3, configured to read and format the image data in the local FIFO according to a control logic, and transmit the image data formatted to the DDR memory; and a write DDR address control logic module 5.4, configured to output the control logic.

Figure 6:
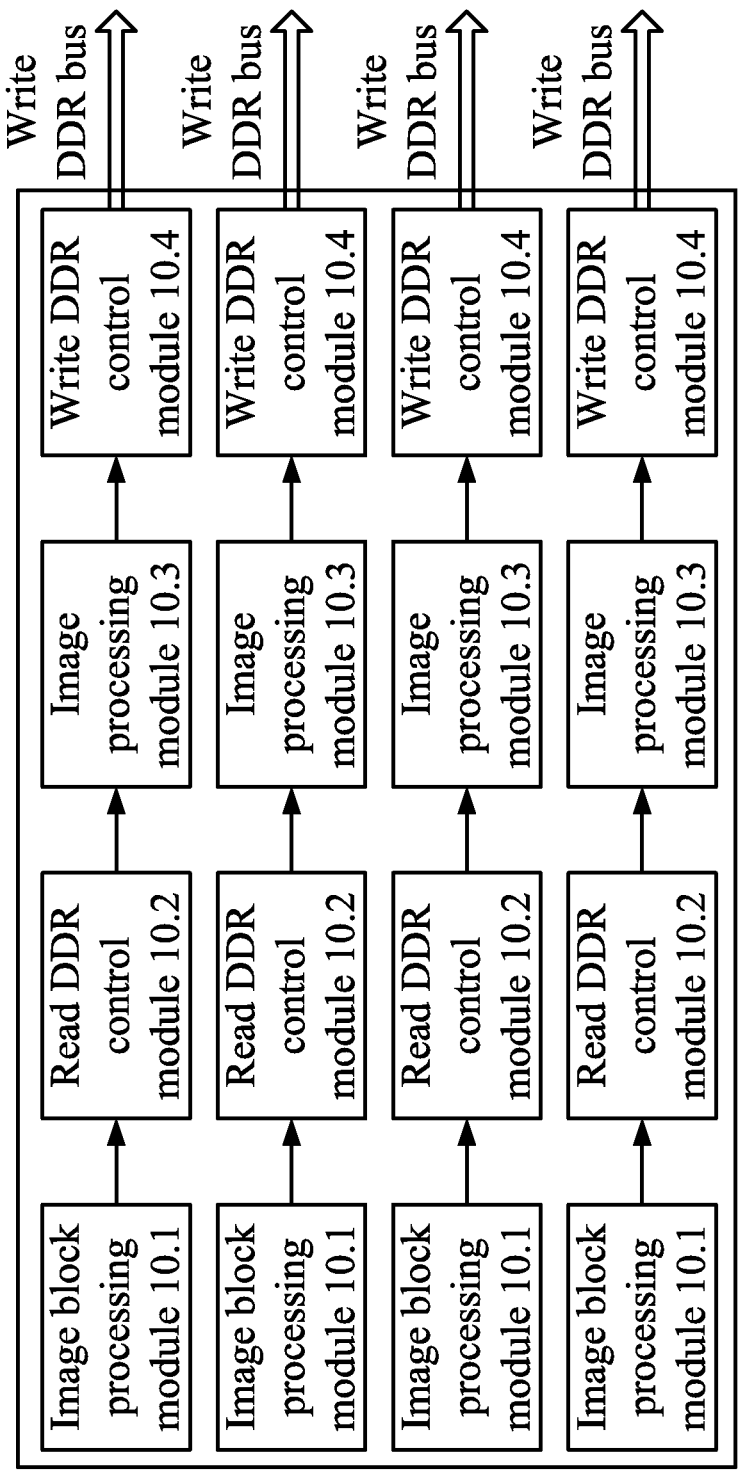
FIG. 6 is a schematic diagram of an image processing accelerator according to one embodiment of the disclosure.

As shown in FIG. 6, the image processing accelerator 10, based on the parallel processing ability of FPGA, instantiates multiple image processing IP simultaneously, and divides the image in blocks. The FPGA accelerating one-dimensional fast Fourier transform (FFT) is taken as an example to illustrate:

1) an image block processing module 10.1 divides an image in 4 blocks according to the control commands in the horizontal direction;

2) a read DDR control module 10.2 reads and transmits the 4 image blocks stored in the DDR memory to an image processing module;

3) the image processing module 10.3 preprocesses the received 4 image blocks; and 4) a write DDR control module 10.4 stores the image data preprocessed in the DDR memory.

In one embodiment, it takes 10 ms for four FFT accelerator to process a 4 k×4 k image. For the same image, the CPU processing spends 400 ms, GPU spends 10 ms. The FPGA accelerator and GPU have the same time consumption. When FPGA resources are sufficient, increasing parallel FPGA can further accelerate the processing time.

Figure 7:
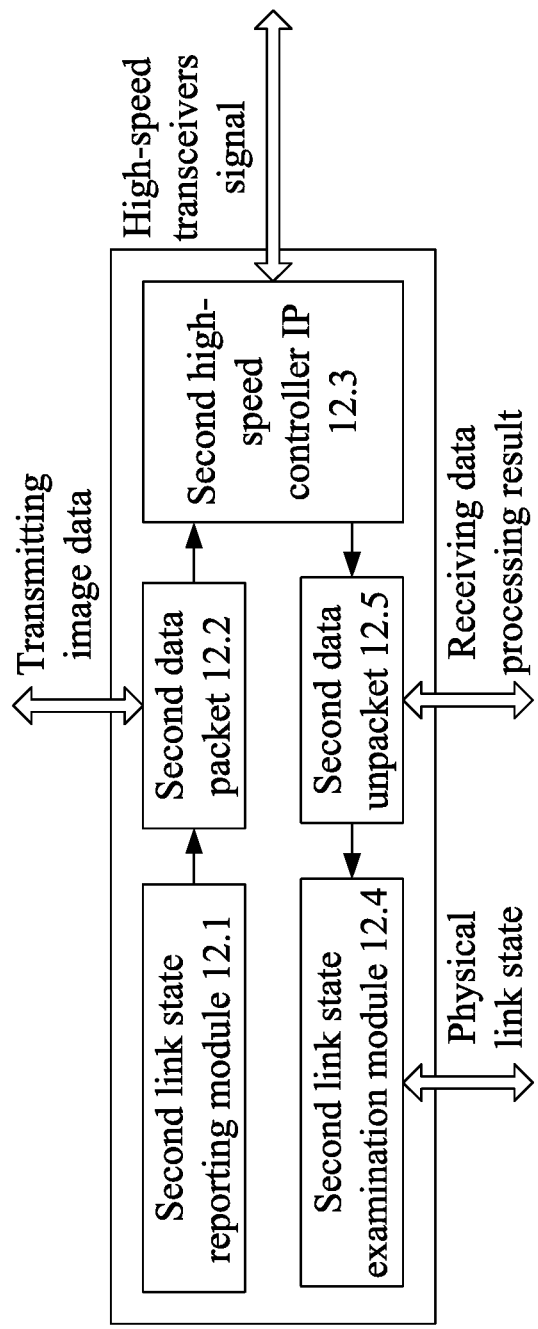
FIG. 7 is a schematic diagram of a data distribution and transmission module according to one embodiment of the disclosure.

As shown in FIG. 7, the data distribution and transmission module 12 comprises:

a second link state reporting module 12.1, configured to regularly transmit a physical link state of the data distribution and transmission module to a second data packet; in one embodiment, the regular time is 65.536 µs;

a second data packet 12.2, configured to packet and transmit the image data received to a second high-speed controller IP;

the second high-speed controller IP 12.3, configured transmit the image data received to the PC, and receive the data processing result from the PC; in one embodiment, the data communication between GTH transceiver IP of xilinx and high-speed transceivers adopts Aurora 64b/66b protocol;

a second link state examination module 12.4, configured to regularly receive the physical link state from a second data unpacket; in one embodiment, the regular time is 65.536 µs; when the end-to-end reporting is not detected for three consecutive times, the link is considered to be lost; and the second data unpacket 12.5, configured to analyze the data processing result from the PC and the physical link state of the data distribution and transmission module.

Figure 8:
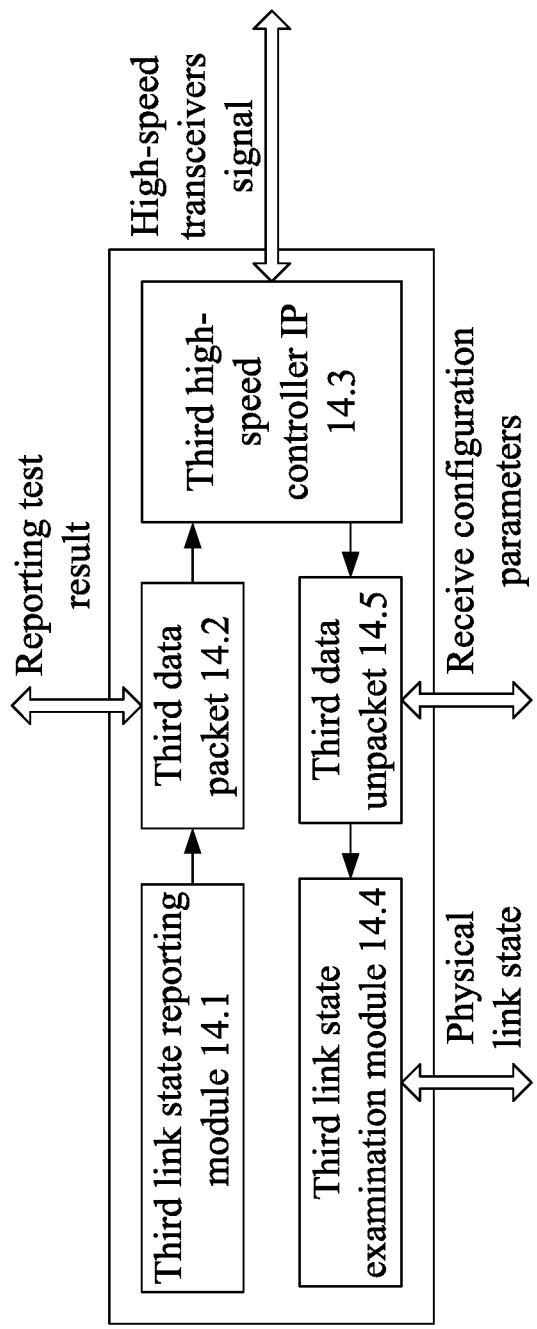
FIG. 8 is a schematic diagram of an interactive control module according to one embodiment of the disclosure.

As shown in FIG. 8, the interactive control module 14 comprises:

a third link state reporting module 14.1, configured to regularly transmit a physical link state of the interactive control module to a third data packet; in one embodiment, the regular time is 65.536 µs;

the third data packet 14.2, configured to packet and transmit the test results received to a third high-speed controller IP;

the third high-speed controller IP 14.3, configured to receive and report the test results, and receive the configuration parameters; in one embodiment, the data communication between GTH transceiver IP of xilinx and high-speed transceivers adopts Aurora 64b/66b protocol;

a third link state examination module 14.4, configured to regularly receive the physical link state reported by a third data unpacket; in one embodiment, the regular time is 65.536 µs; when the end-to-end reporting is not detected for three consecutive times, the link is considered to be lost; and the third data unpacket 14.5, configured to analyze the configuration parameters transmitted by the third high-speed controller IP and the physical link state of the interactive control module.

The control unit 3 further comprises a cascade control module 17 configured to realize the cascade expansion of the FPGA processing platform under the control of the flow control module.

The cascade control module has the same structure as the data distribution and transmission module. The image data that needs to be processed is transmitted to the next level cascade platform, and then distributed to the computing server PC for processing and calculation through the cascade platform, and the processed result is transmitted back to the cascade platform.

It will be obvious to those skilled in the art that changes and modifications may be made, and therefore, the aim in the appended claims is to cover all such changes and modifications.

What is claimed is:

1. A device, comprising:
   1) a field programmable gate array (FPGA) processing platform; and
   2) a personal computer (PC);
   wherein:
   the FPGA processing platform comprises:
   a first fiber interface configured to receive configuration parameters and test commands, and to output test results;
   a second fiber interface configured to exchange data with the PC;
   a third fiber interface configured to receive image data and output the configuration parameters and the test commands;
   a fourth fiber interface configured to control the generation of a screen lighting signal;
   a fifth fiber interface configured to control an input/output (IO) light source;
   a control unit configured to divide and preprocess received image data, and transmit the image data preprocessed to the PC; and the PC is configured to calculate and process the image data received and transmit a data processing result to the control unit;
   the FPGA processing platform further comprises a double data rate (DDR) memory;
   the control unit is configured to receive the configuration parameters and test commands, control the generation of the screen lighting signal and control the IO light source according the configuration parameters and test commands received, receive image data of an acquisition unit, preprocess and transmit the image data received to the PC, receive and gather the data processing result of the PC, and transmit a final test result to the control unit;

the DDR memory is configured to store the image data and the final test result; and the control unit comprises:
an image data receiving module, configured to receive and transmit the image data of the acquisition unit to a DDR data format conversion-and-writing module;
the DDR data format conversion-and-writing module, configured to format the image data received and store the image data formatted in the DDR memory;
a flow control module, configured to transmit control commands to an image processing accelerator and the PC according to set instructions;
the image processing accelerator, configured to preprocess the image data and store the image data processed in the DDR memory according to the control commands of the flow control module;
a data distribution control module, configured to distribute the image data to a data distribution and transmission module according to the control commands of the flow control module;
the data distribution and transmission module, configured to receive and transmit the image data to the PC, and receive and transmit the data processing result of the PC to an analysis and processing module; and
the analysis and processing module, configured to analyze the data processing result to generate the final test result.

2. The device of claim 1, wherein the control unit further comprises:
an interactive control module, an IO control module, and a screen lighting signal generation module;
the interactive control module is configured to receive the test commands and report test results;
the flow control module is further configured to assign the test commands received to the IO control module and a signal spreading module;
the IO control module is configured to control the IO light source according to the test commands; and
the screen lighting signal generation module is configured to control the generation of the screen lighting signal according to the test commands.

3. The device of claim 1, wherein the image data receiving module comprises:
a first link state reporting module, configured to regularly transmit a physical link state of the image data receiving module to a first data packet;
a first data packet, configured to packet and transmit the physical link state of the image data receiving module, the configuration parameters and the test commands to a first high-speed controller IP;
the first high-speed controller IP, configured to receive the image data of the acquisition unit and transmit the configuration parameters and test commands to the acquisition unit;
a first link state examination module, configured to regularly receive the physical link state from a first data unpacket; and
the first data unpacket, configured to analyze and output the image data transmitted by the first high-speed controller IP to the DDR data format conversion-and-writing module.

4. The device of claim 1, wherein the DDR data format conversion-and-writing module comprises:
an image data receiving module, configured to receive and transmit the image data to a local FIFO;
the local FIFO, configured to store the image data;
a read FIFO data interface conversion module, configured to read and format the image data in the local FIFO according to a control logic, and transmit the image data formatted to the DDR memory; and
a write DDR address control logic module, configured to output the control logic.

5. The device of claim 1, wherein the image processing accelerator comprises:
an image block processing module, configured to divide an image in blocks according to the control commands;
a read DDR control module, configured to read and transmit the image data stored in the DDR memory to an image processing module;
the image processing module, configured to preprocess the image data received; and
a write DDR control module, configured to store the image data preprocessed in the DDR memory.

6. The device of claim 1, wherein the data distribution control module comprises:
a second link state reporting module, configured to regularly transmit a physical link state of the data distribution and transmission module to a second data packet;
a second data packet, configured to packet and transmit the image data received to a second high-speed controller IP;
the second high-speed controller IP, configured transmit the image data received to the PC, and receive the data processing result from the PC;
a second link state examination module, configured to regularly receive the physical link state from a second data unpacket; and
the second data unpacket, configured to analyze the data processing result from the PC and the physical link state of the data distribution and transmission module.

7. The device of claim 2, wherein the interactive control module comprises:
a third link state reporting module, configured to regularly transmit a physical link state of the interactive control module to a third data packet;
the third data packet, configured to packet and transmit the test results received to a third high-speed controller IP;
the third high-speed controller IP, configured to receive and report the test results, and receive the configuration parameters;
a third link state examination module, configured to regularly receive the physical link state reported by a third data unpacket; and
the third data unpacket, configured to analyze the configuration parameters transmitted by the third high-speed controller IP and the physical link state of the interactive control module.

8. The device of claim 1, wherein the control unit further comprises a cascade control module configured to realize cascade expansion of the FPGA processing platform under the control of the flow control module.

* * * * *